(12) United States Patent
Carberry

(10) Patent No.: US 7,116,858 B1
(45) Date of Patent: Oct. 3, 2006

(54) OPTICAL SWITCH ELEMENTS

(76) Inventor: John J. Carberry, 2914 Lake Forest Cir., Talbott, TN (US) 37877

( * ) Notice: Subject to any disclaimer, the term of this patent is extended or adjusted under 35 U.S.C. 154(b) by 0 days.

(21) Appl. No.: 10/908,733

(22) Filed: May 24, 2005

(51) Int. Cl.
*G02B 385/14* (2006.01)
*G02B 385/18* (2006.01)
*G02B 385/16* (2006.01)

(52) U.S. Cl. .............................. 385/18; 385/14; 385/16
(58) Field of Classification Search ................ 385/14, 385/16
See application file for complete search history.

(56) References Cited

U.S. PATENT DOCUMENTS

| | | | |
|---|---|---|---|
| 6,321,654 B1 * | 11/2001 | Robinson .................... | 102/251 |
| 6,430,335 B1 * | 8/2002 | Carberry et al. .............. | 385/20 |
| 6,606,429 B1 * | 8/2003 | Carberry et al. .............. | 385/23 |
| 6,735,006 B1 | 5/2004 | Carberry et al. ............ | 359/212 |
| 6,862,381 B1 * | 3/2005 | Mitsuhashi ................... | 385/17 |
| 2002/0172453 A1 | 11/2002 | Carberry et al. .............. | 385/20 |
| 2003/0128915 A1 | 7/2003 | Smith et al. ................... | 385/23 |
| 2003/0206682 A1 | 11/2003 | Guynn et al. ................. | 385/16 |
| 2004/0057129 A1 | 3/2004 | Tekippe ....................... | 359/819 |
| 2004/0252937 A1 | 12/2004 | Guynn et al. ................. | 385/18 |
| 2005/0074236 A1 * | 4/2005 | Urimindi et al. ............. | 398/12 |

* cited by examiner

*Primary Examiner*—Sung Pak
*Assistant Examiner*—Hoang Tran
(74) *Attorney, Agent, or Firm*—Luedeka, Neely & Graham, PC

(57) ABSTRACT

An optical switch element, methods form making an optical switch element and optical switches containing the optical switch element. The optical switch element includes a housing containing a longitudinal channel therein having a channel axis defined along a length of the longitudinal channel. An elongate shuttle having a mirrored surface on at least one end thereof is disposed in the longitudinal channel for lateral movement substantially transverse to the channel axis between a first latch position and a second latch position. The shuttle contains a rare earth magnet for interacting with first and second magnetic coils in the housing to cause movement of the shuttle between the first latch position and the second latch position. At least one shuttle guide is provided for guiding movement of the shuttle between the first latch position and the second latch position.

20 Claims, 10 Drawing Sheets

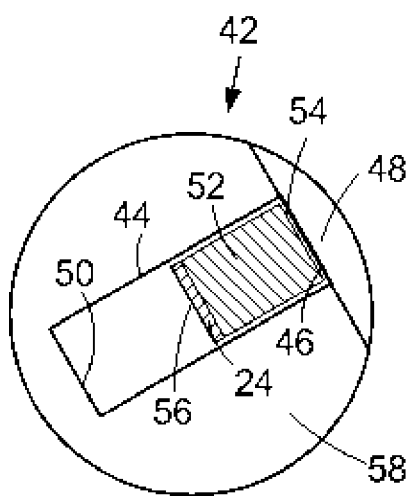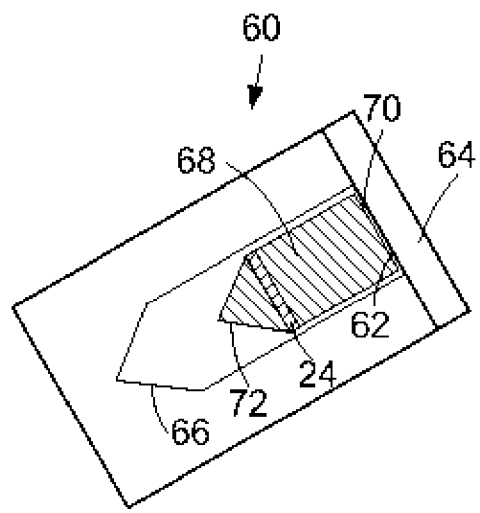
FIG. 5A  FIG. 5B
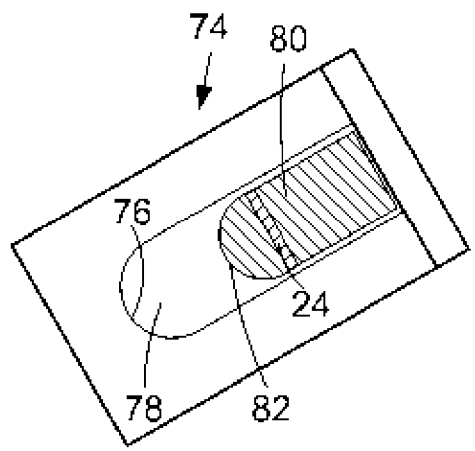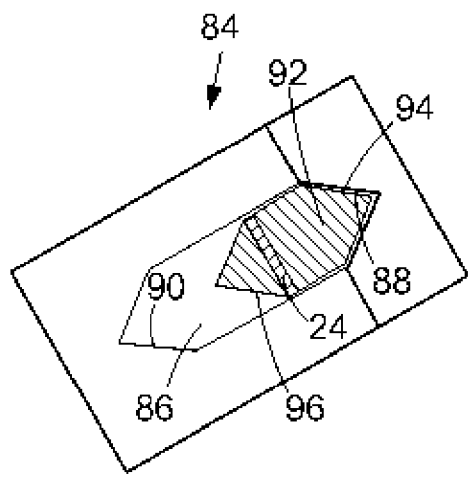
FIG. 5C  FIG. 5D
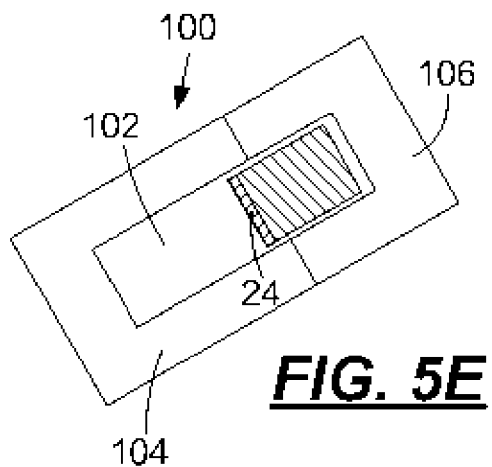
FIG. 5E

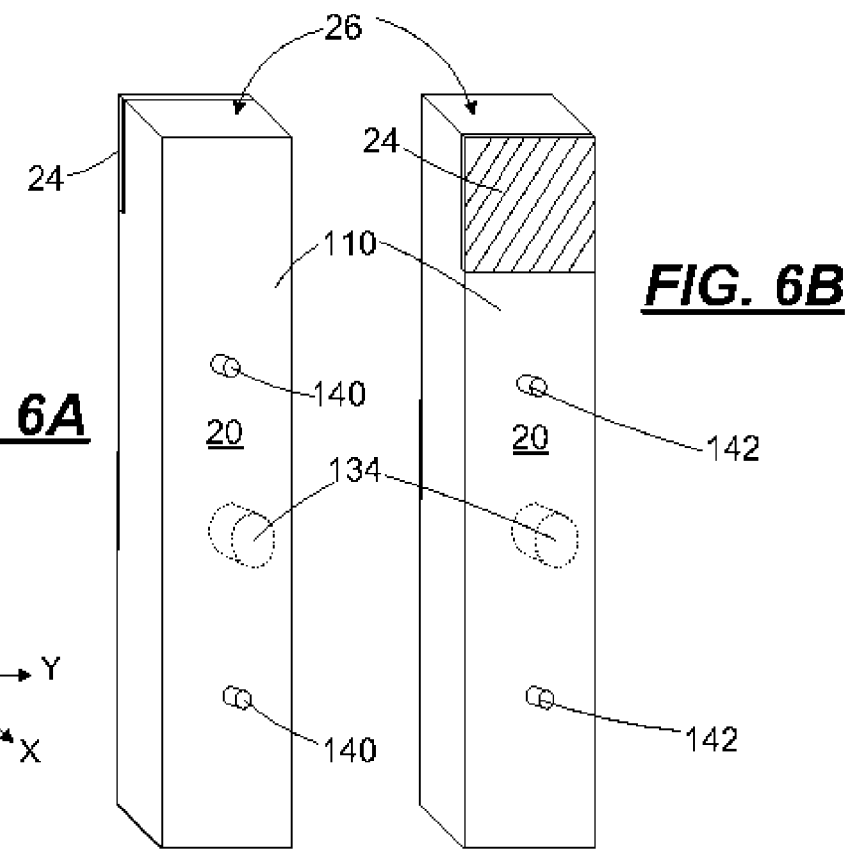
*FIG. 6A*  *FIG. 6B*
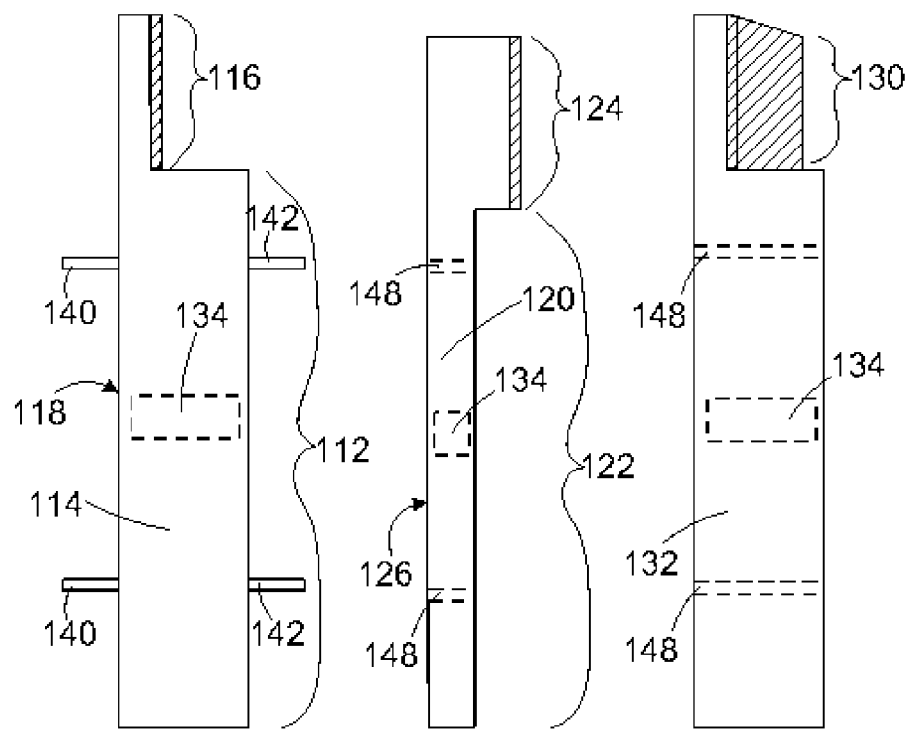
*FIG. 6C*  *FIG. 6D*  *FIG. 6E*

OPTICAL SWITCH ELEMENTS

FIELD OF THE DISCLOSURE

The disclosure relates to optical switching devices and in particular to improved optical switch elements that have tolerances that improve production yields, reduce production costs, and provide greater environmental and long term operability.

BACKGROUND AND SUMMARY

Over the past decade, a variety of optical switch technologies were developed by the photonic industry for telecommunication applications such as network protection, network restoration, equipment and device redundancy, performance monitoring, research and development, spectral interferometry, and the like. Other applications for optical switches include medical, aerospace, national defense, and other manufacturing and industrial industries. Despite the growing demand for optical switches, virtually none of technologies have been commercially exploited due to reliability, scalability, optical performance, cost, and long term performance problems associated with design tolerances required for manufacturing and assembling optical switches and optical switch containing devices.

A number of the foregoing applications for optical switches require switch assembly tolerances that are beyond the level of achievability for mass production of such switches. For example, for critical switching applications, optical switches must be optically clear so that the insertion loss is less than about 0.5 dB, the temperature dependence loss is less than 0.1 dB at −40° to +85° C., the polarization dependence loss must be less than 0.05 dB, the low wavelength dependent loss must range from 1250 to 1650 nanometers, and there must be a low wavelength dependent loss for multi-mode switching.

From an operational reliability point of view, the optical switches must maintain operability during long term dormancy and storage at temperatures cycling from −40° to +85° C., remain operable during extreme shock at vibration episodes, be capable of operation for tens of millions of switching cycles, have a resistance to humidity above about 85% relative humidity, have a repeatability within 0.01 dB over a life time which may include tens of millions of cycles, or one cycle after a prolonged dormant period of standby use. Other important characteristics of optical switches are that they have switching times of less than about 5 milliseconds, very low operating current, low voltage, and low power requirements, power-off latching, and multi-mode or single mode capabilities.

Many of the foregoing parameters are extremely difficult or impossible to achieve without a radical change in optical switch technology. In view of the foregoing, there is a continuing need for improved optical switches that can be mass produced at relatively low cost and in relatively high yields.

With regard to the foregoing, the disclosure provides an optical switch element, methods for manufacturing an optical switch element, and optical switch devices containing the optical switch element. The optical switch element includes, a housing containing a longitudinal channel therein having a channel axis defined along a length of the longitudinal channel. The longitudinal channel contains a first machined surface on a first side of the channel, a second surface on an opposite side of the channel from the first surface, a first magnetic coil adjacent the first surface of the channel and a second magnetic coil adjacent the second surface of the channel. An elongate shuttle having a mirrored surface on at least one end thereof is disposed in the longitudinal channel for lateral movement substantially transverse to the channel axis between a first latch position adjacent the first machined surface and a second latch position adjacent the second surface. The shuttle includes a rare earth magnet for interacting with the first and second magnetic coils to cause movement of the shuttle between the first latch position and the second latch position. At least one shuttle guide is provided for guiding movement of the shuttle between the first latch position and the second latch position.

In another embodiment, the disclosure provides a method for manufacturing an optical switch element for an optical switching. The method includes providing an elongate housing including a channel portion and a cover plate portion. An elongate channel is machined in the channel portion of the housing. The elongate channel has a channel axis defined along a length thereof and has a first machine surface and a second surface opposite the first surface. A first magnetic coil is included in the housing adjacent the first surface. A second magnetic coil is included in the housing adjacent the second surface. A planar surface is machined on the cover plate portion to provide a first latch surface. An elongate substantially rectangular shuttle containing a mirrored surface on at least one end is disposed in the elongate channel for lateral movement transverse to the channel axis. The shuttle contains a rare earth magnet for interacting with the first and second magnetic coils. At least one shuttle guide is installed in the housing for translational movement of the shuttle thereon. The cover plate portion is fixedly attached to the channel portion to provide the optical switch element.

An advantage of embodiments of the disclosure is that the body and shuttle components of an optical switch element are capable of manufacturing and assembly without the need for multiple six-axes alignment steps. In a conventional optical switch element, the shuttle is cylindrical and slides longitudinally along a longitudinal axis of an elongate, cylindrical channel in the switch element housing. Accordingly, in such a device, six axes are articulated in order to achieve low insertion loss, with virtually no excess loss due to misalignment along any of the six axes.

In the switch elements of the disclosed embodiments, the shuttle moves in a single Y or X-axis orthogonal to a Z-axis, to a latch position on a machined, substantially planar surface of the housing channel. One or more guides are provided for translational movement of the shuttle thereon along the X-axis and for alignment of the shuttle along the Z-axis. The pitch, roll, and yaw of the device are permanently fixed by mating a machined, substantially planar surface of the shuttle with a machined, substantially planar surface of the housing channel.

BRIEF DESCRIPTION OF THE DRAWINGS

Further features and advantages of exemplary embodiments disclosed herein may become apparent by reference to the detailed description when considered in conjunction with the figures, which are not to scale, wherein like reference numbers indicate like elements through the several views, and wherein:

FIGS. 5A–5E are alternative configurations for a longitudinal channel and shuttle for an optical switch element according to the disclosure;

FIGS. 6A and 6B are opposite side perspective views, not to scale, of a shuttle for an optical switch element according to the disclosure;

FIGS. 6C–6E are elevational views, not to scale, of shuttles for an optical switch elements according to the disclosure;

DETAILED DESCRIPTION OF EXEMPLARY EMBODIMENTS

Figure 1:
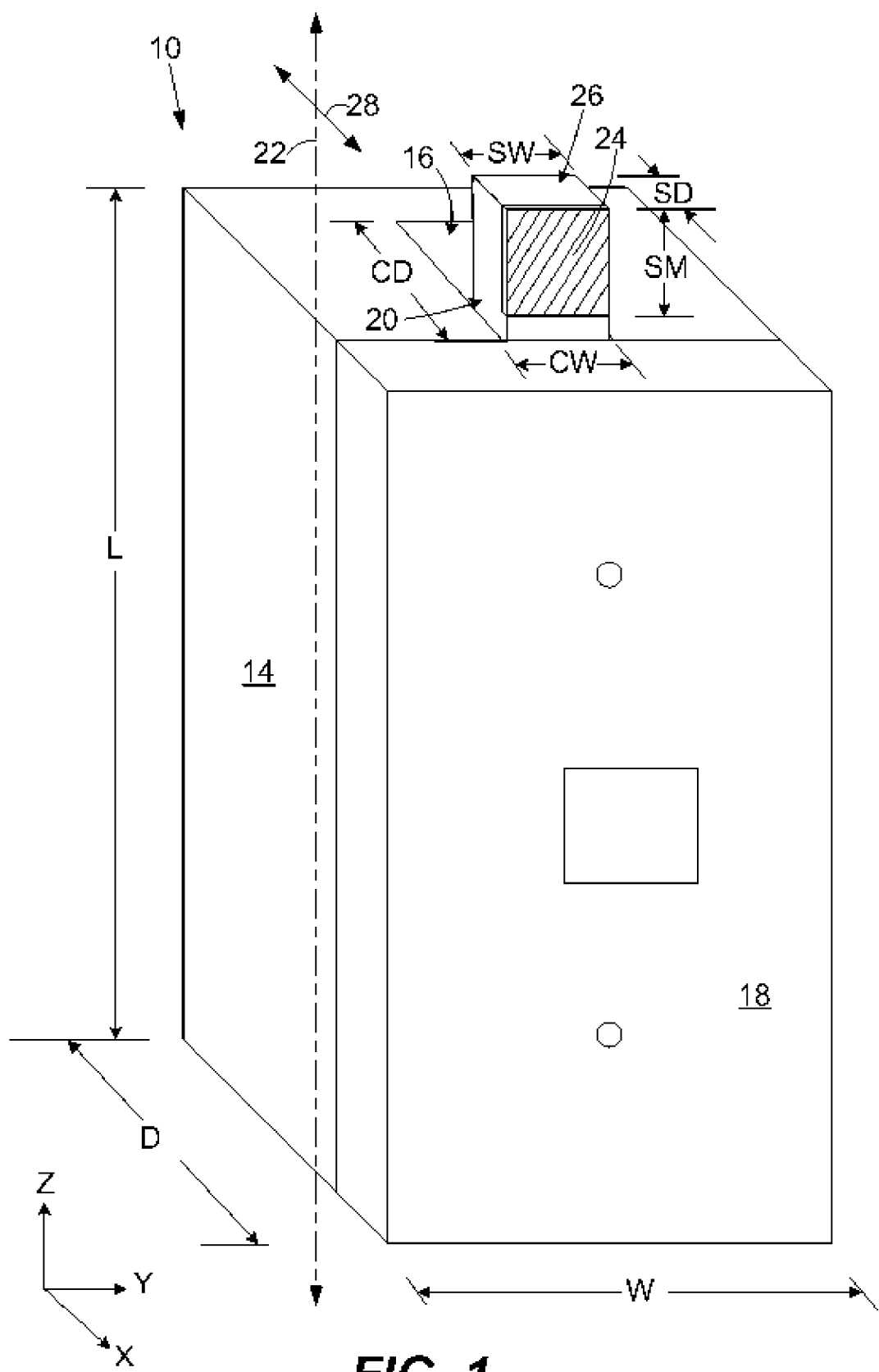
FIG. 1 is a perspective view, not to scale, of a switch element for an optical switch device according to the disclosure.
Figure 2:
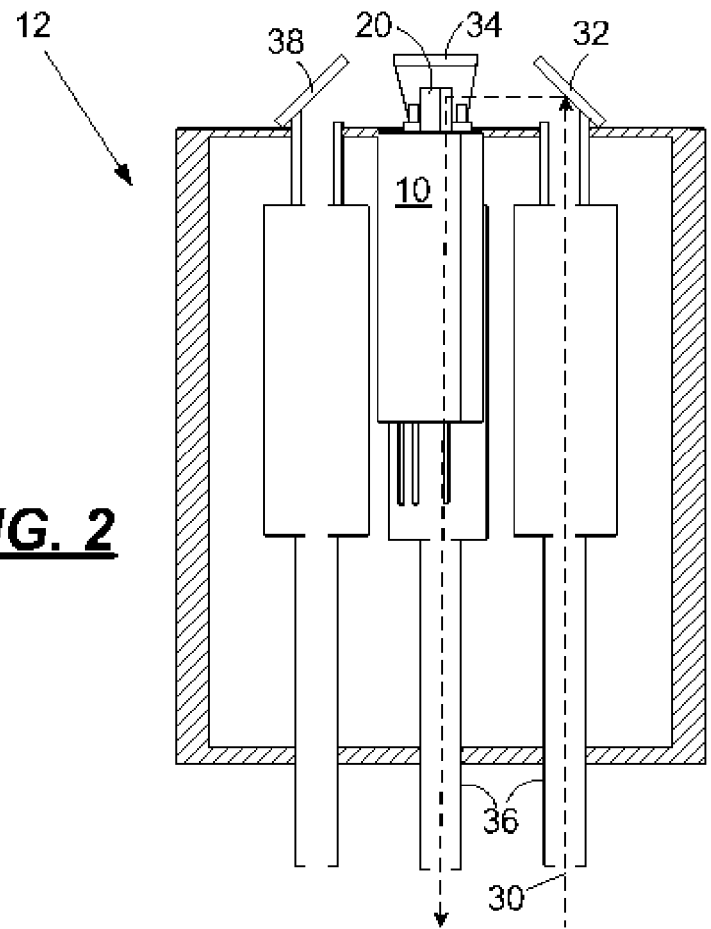
FIG. 2 is a partial cut-away views not to scales, of an optical switch device containing a switch element according to the disclosure.

With reference to FIGS. 1 and 2, there is illustrated in perspective view, not to scale, a portion of a switch element 10 for an optical switch device 12. The switch element includes a housing component 14 having a longitudinal channel 16 therein, a cover plate component 18 and an elongate shuttle 20 disposed in the housing component 14. The housing component 14, cover plate component 18, and shuttle 20 may be made of fused quartz or rebounded fused silica, as well as a wide variety of ceramic and ceramic composite materials, provided the materials are machineable or moldable in manufacturing to a degree of flatness set forth below. The foregoing materials must be relatively stable at temperatures ranging from about −40° C. to about +85° C. Relatively stable components have a coefficient of thermal expansion (CTE) of less than 1 ppm per ° C., typically about 0.5 ppm per ° C. or less.

The overall length L of the housing component 14 and cover plate component 18 may range from about 5 to about 15 millimeters. The overall width W of the switch element 10 may range from about 2 to about 5 millimeters and the overall depth D may range from about 1.5 to about 5 millimeters.

The channel 16 is formed in at least the housing component 14 and has a longitudinal axis represented by arrow 22 along the length L of the channel and housing component 14. The channel depth CD may range from about 0.5 to about 1.4 millimeters and the channel width CW may range from about 300 to about 1000 microns.

The shuttle 20 is slightly longer than the length L of the housing component 14 and has a mirror surface 24 on at least one end 26 thereof. Accordingly, the shuttle 20 may have a length ranging from about 6 to about 16 millimeters with a shuttle depth SD ranging from about 150 to about 600 microns and a shuttle width SW ranging from about 500 to about 800 microns.

The mirror surface 24 on at least one end of the shuttle 20 is typically a substantially square area having a dimension SM ranging from about 500 to about 800 microns. The mirror surface 24 may be provided by depositing a reflective material on a portion of the shuttle 20 adjacent the end 26 thereof or by adhesively attaching a reflective material to the shuttle 20. It will be appreciated that an opposite end of the shuttle 20 may also contain a mirror surface similar to surface 24 on a same or different side surface of the shuttle 20.

As shown in FIG. 1, the shuttle 20 moves in the channel 16 in the direction of arrow 28 which is substantially transverse to the longitudinal axis of the housing component 14 axis represented by arrow 22. Accordingly, the shuttle 20 is disposed in the channel 16 so that it moves from a first latch position adjacent the cover plate component 18 to a second latch position distal from the cover plate component 18.

Figure 3A:
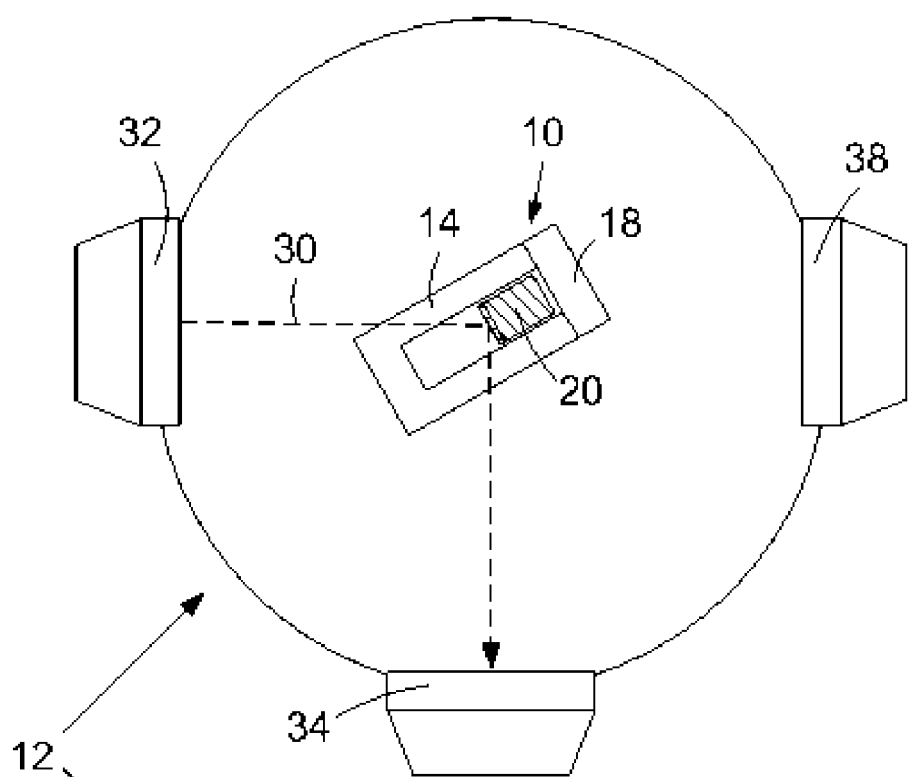
FIGS. 3A–3B are schematic illustrations of operation of an optical switch device containing a switch element according to the disclosure.
Figure 3B:
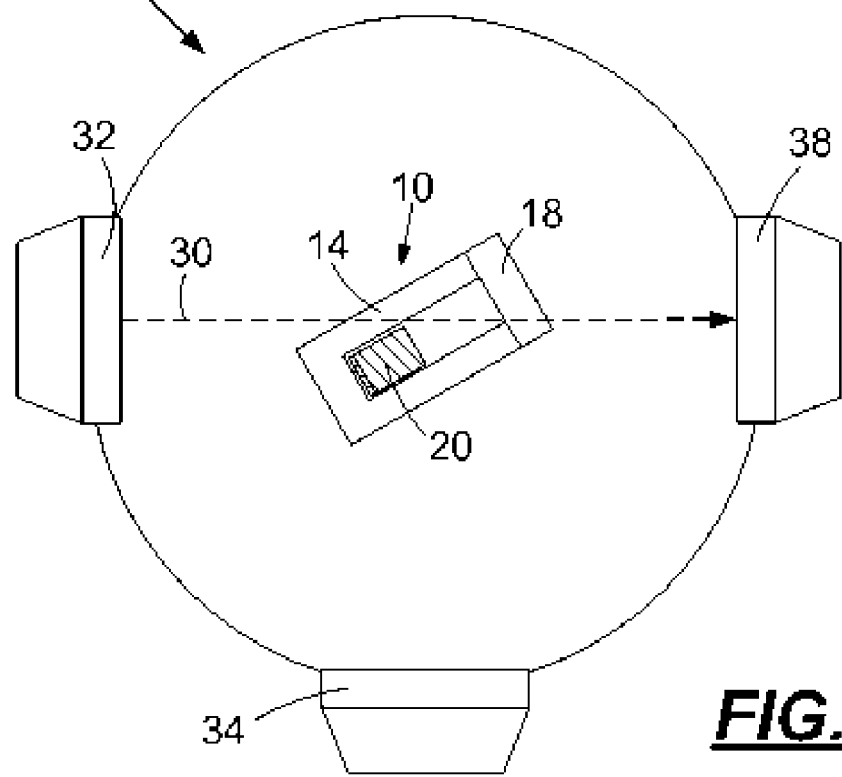

With reference to FIG. 3A, there is shown an optical switch 12 containing the switch element 10 wherein the shuttle 20 is in a first latch position adjacent the cover plate component 18. In the first latch position, a collimated beam of light represented by arrow 30 is directed from a first mirror 32 to a second mirror 34 wherein the collimated beam is collected for retransmittal through an optical fiber 36 (FIG. 2). In FIG. 3B, the shuttle 20 has moved to the second latch position wherein the collimated beam of light 30 is directed from the first mirror 32 to a third mirror 38. The mirrors 32 and 34, for example, may be used to direct the light beam into and out of a variety of optical components including collimators, other mirrors, active or passive devices such as detectors, sources, filters, or such optical components may be put directly into the path of the shuttle.

Figure 4:
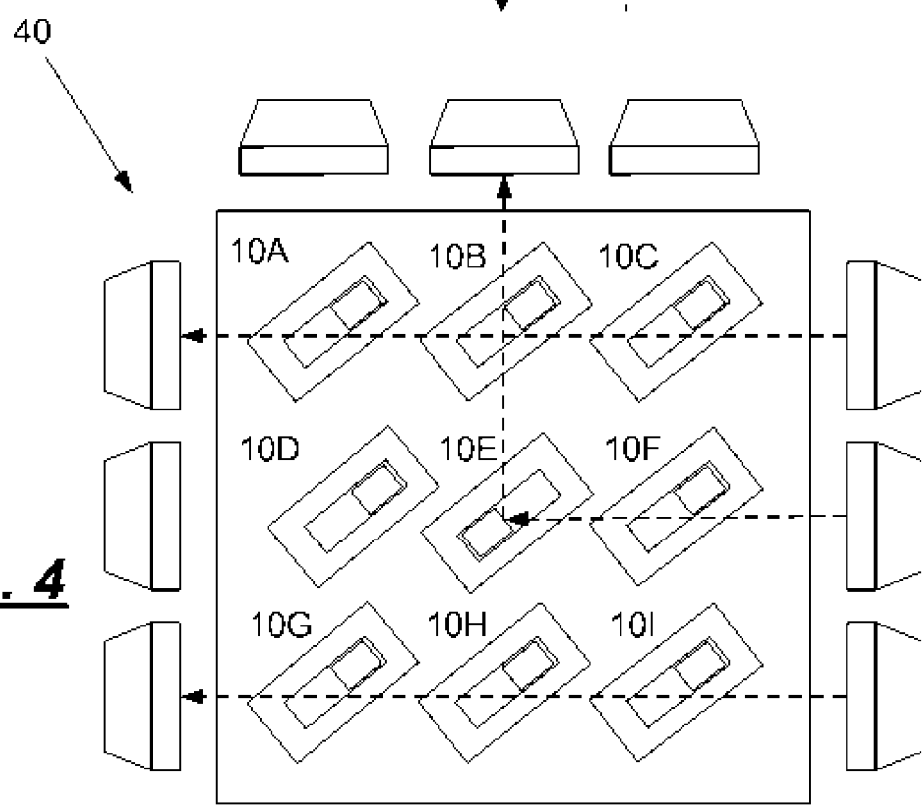
FIG. 4 is a schematic illustration of an optical switch device containing a plurality of switch elements according to the disclosure.

As shown in FIGS. 2, 3A and 3B, an optical switch may include a single switch element 10 or, as shown in FIG. 4, an optical switch may include a plurality of switch elements 10A–10I that may be arrayed in an M×N array of switch elements. Examples of arrays of switch elements 10 include a one by one array, a one by two array, a two by two array, a four by four array, a one by eight array, a one by sixteen array, a sixty-four by sixty four array, and the like.

In FIGS. 1–4, rectangular switch elements 10, rectangular channels 16, and rectangular shuttles 20 are illustrated. However, the housing component 14, channel 16 and shuttle 20 are not limited to rectangular configurations. Accordingly, various alternative configurations for switch elements according to the disclosure are illustrated schematically in FIGS. 5A–5E.

In FIG. 5A, a substantially cylindrical switch element 42 includes a substantially rectangular channel 44 having a first substantially planar latch surface 46 adjacent a cover plate component 48, a second substantially planar latch surface 50 distal from the cover plate component 48, and a substantially rectangular shuttle 52 having planar surfaces 54 and 56 corresponding the to latch surfaces 46 and 50. In this embodiment, the housing component 58 together with the cover plate component 48 provide the substantially cylindrical switch element 42.

In FIGS. 5B through 5D, alternative channel configurations and corresponding shuttle configurations are illustrated. For example, in FIG. 5B, the switch element 60 may have a first latch surface 62 adjacent a cover component 64 that is substantially planar and a second latch surface 66 distal from the first latch surface 62 that has a triangular profile as shown. Accordingly, a shuttle 68 has a corresponding planar surface 70 and an opposite surface 72 having a triangular profile.

In FIG. 5C, a switch element 74 has a second latch surface 76 in a longitudinal channel 78 having a semicircular profile. Likewise, the shuttle 80 has a surface 82 having a profile corresponding to the second latch surface 76.

In FIG. 5D, a switch element 84 includes a channel 86 having triangular profiles for both first and second latch surfaces 88 and 90. In this embodiment, the shuttle 92 includes surfaces 94 and 96 having triangular profiles corresponding to the profiles of the channel 86. Various combinations of the forgoing housing components, cover plate components, and channel profiles may be used in switch elements contemplated by this disclosure.

In the foregoing embodiments of FIGS. 1–5D, the longitudinal channels for the shuttles have been provided entirely in the housing component of the switch element. However, as shown in FIG. 5E, a switch element 100, as disclosed herein, may have a channel 102 formed partly in a housing component 104 and partly in a cover plate component 106. Regardless of the configuration of the housing component, cover plate component and shuttle, it is highly desirable from a manufacturing and assembly point of view that the channel have at least one latch surface or portion of a latch surface that may be machined to a relatively flat or planar configuration as illustrated in FIGS. 5A–5E and described above. Such a machine surface provides a defined latch position for operation of the switch element in a collimated light beam reflecting mode as shown in FIGS. 2 and 3A. Accordingly, the flatness of the at least one latch position may be at least about λ/2 at 600 nanometers. The machined quality of the at least one latch surface may have a roughness grade of at least N-3 or better for the purposes of providing switch elements for optical switches as described herein.

Providing at least one flat face machined surface on both the shuttle 20 and latch surface of the channel 16 significantly reduces the complexity of the alignment between the shuttle and the channel 16. Such flat face to flat face interaction provides alignment repeatability for pitch, roll, and yaw which are the three most critical axial alignments for the switch element 10. With regard to pitch, roll, and yaw, the shuttle 20 is substantially confined by the channel 16 to always return to the same position when moving from the second latch position to the first latch position.

Details of the shuttle and the housing component according to embodiments of the disclosure are provided in FIGS. 6A–6E and FIGS. 7A–7B. With reference to FIGS. 6A and 6B, the shuttle 20 includes the mirror surface 24 adjacent one end 26 thereof. The shuttle 20 also includes a shuttle body 110 that may be made of fused drawn quartz or rebounded fused silica or other ceramic or ceramic composite materials having a CTE of less than about 1 ppm per degree C.

In FIGS. 6A and 6B, the shuttle body 110 is shown as an elongate substantially rectangular body 110. Alternate configurations of the shuttle body are illustrated in FIGS. 6C–6E. In FIG. 6C, a main portion 112 of the shuttle body 114 has an elongate substantially rectangular configuration. The main portion 112 is disposed in the longitudinal channel 16 of the housing component 14. A mirror portion 116 of the shuttle body 114 is recessed from a flat face surface 118 of the shuttle body 114. The flat face surface 118 mates with the flat face surface of the first latch surface of the channel 16, described above.

In an alternate configuration illustrated in FIG. 6D, a shuttle body 120 having a recessed portion 122 and a non-recessed mirror portion 124 is provided. As in the previously described embodiment, a flat face surface 126 is provided to mate with the first latch surface of the channel 116.

In FIGS. 3A–3B, the switch element 10 is illustrated in an angled configuration in the switch 12 with respect to the collimated light beam 30. However, rather than angling the entire switch element 10 in with respect to the light beam 30, only a mirror portion 130 may be angled with respect to a shuttle body 132 as illustrated in FIG. 6E. In this embodiment, the switch element 10 may have an axis along arrow 28 that is substantially parallel with the light beam 30.

Figure 7A:
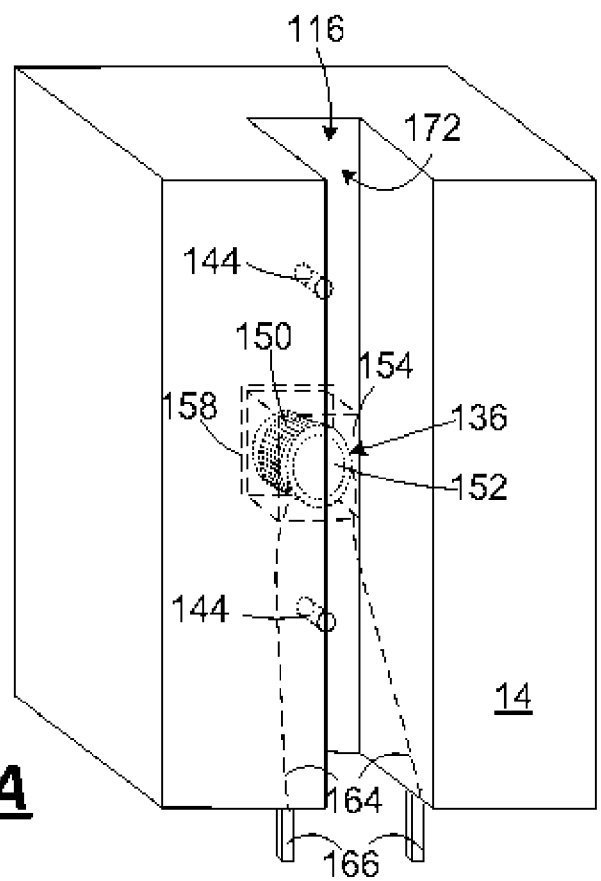
FIG. 7A is a perspective view, not to scale, of a housing component for a switch element according to the disclosure.
Figure 7B:
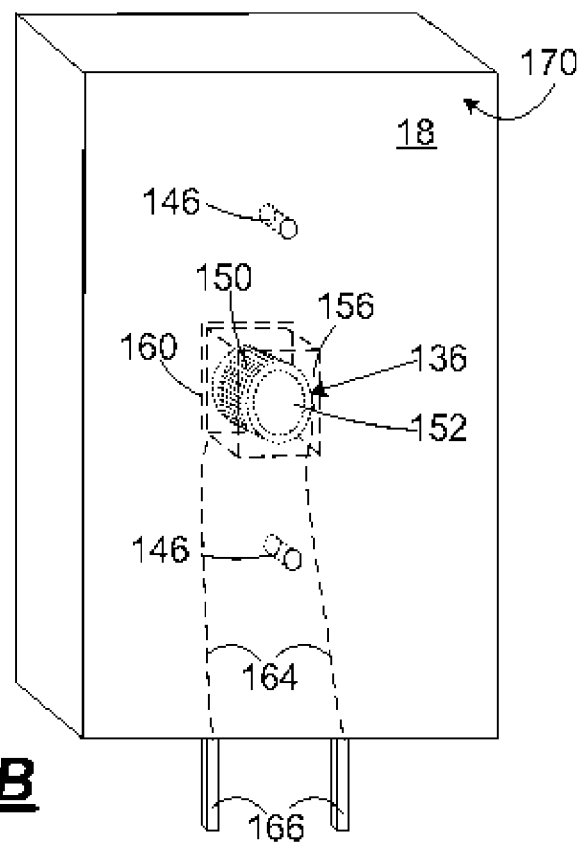
FIG. 7B is a perspective view, not to scale, of a cover plate component for a switch element according to the disclosure.

In each of the embodiments illustrated in FIGS. 6A to 6E, the shuttle includes a permanent magnet 134 embedded within the shuttle body 110, 114, 120, and 132. The permanent magnet 134 is two-pole magnet having a high degree of permanent magnetism. Examples of such magnets are those formed of rare earth materials such as samarium cobalt and neodymium iron boron (NdFeB). Such magnetic materials typically exhibit approximately ten or more times the total energy per unit volume when compared to standard ferrite magnets. Suitable magnetic materials for magnet 134 are described for example in U.S. Pat. No. 6,606,429. By embedding the magnet 134 in the shuttle body 110, 114, 120, and 132, there is substantially no direct contact between the magnet 134 and electromagnetic coils 136 in the housing component 14 and cover plate component 18 (FIGS. 7A and 7B). Accordingly, latching of the shuttle body 110, 114, 120, and 132 in the first and second latch positions does not require the presence of mechanical latching devices such as wires or springs and may be achieved without metal to metal contact between the coils 136 and the magnet 134.

In order to maintain alignment in a Z-direction, the shuttle body 110 or 114 may include one or more alignment pins 140 and 142 for movement in corresponding one or more alignment guide holes 144 and 146 in the housing component 14 and cover plate component 18 respectively. Use of at least two pairs of spaced-apart alignment pins 140 and 142 may also resolve alignment of the shuttle body 110, 114, 120, and 132 in the X and Y-directions in the channel 116.

In FIGS. 6D and 6E, the shuttle bodies 120 and 132 contain alignment guide holes 148. Wires or fibers attached to the housing component 14 and cover plate component 18 may be used to guide the shuttle bodies 120 and 132 thereon, as described in more detail below. The alignment pins 140 and 142, or wires may be made from a variety of materials including low thermal expansion materials such as fused silica.

Each of the electromagnetic coils 136 in the housing component 14 and cover plate component 18 may be provided by a coil of copper wire 150, approximately in diameter wrapped around a fifty weight percent nickel iron core 152 with about 400 turns of wire 150. The electromagnetic coils 136 are embedded in cavities 154 and 156 in the housing component 14 and cover plate component 18 respectively. Covers 158 and 160 made of the same material as the housing component 14 and cover plate component 18 may be used to hold the electromagnetic coils 136 in place.

Conductive leads 164 are provided between the coils 136 and contact pins 166 for activating the coils 136 in order to drive the shuttle 20 to the first and second latch positions. In the first latch position, the shuttle 20 is adjacent a machined, substantially flat surface 170 of the cover plate component 18. In this position, the coils 136 in the housing component 14 and the cover plate component 18 are both activated. The coil 136 in the cover plate component 18 is activated to attract the embedded magnet 134, and the coil 136 in the housing component is activated to repel the embedded magnet 134. In order to move the shuttle 20 toward the second latch position adjacent a surface 172 of the housing component 14, the current to the coils 136 is reversed. Movement of the shuttle 20 from the first latch position adjacent surface 170 to the second latch position adjacent the surface 172 is typically occurs in less than 5 milliseconds. In the second latch position, the mirror surface 24 is typically outside of the light beam 30 and thus the surface 172 need not have the same degree of machining and flatness as the first latch surface 170, provided the mirror surface 24 has moved completely out of the path of the light beam 30 in the second latch position. In the alternative, the surface 172 may have the same degree of machining and flatness as the surface 170.

Figure 8:
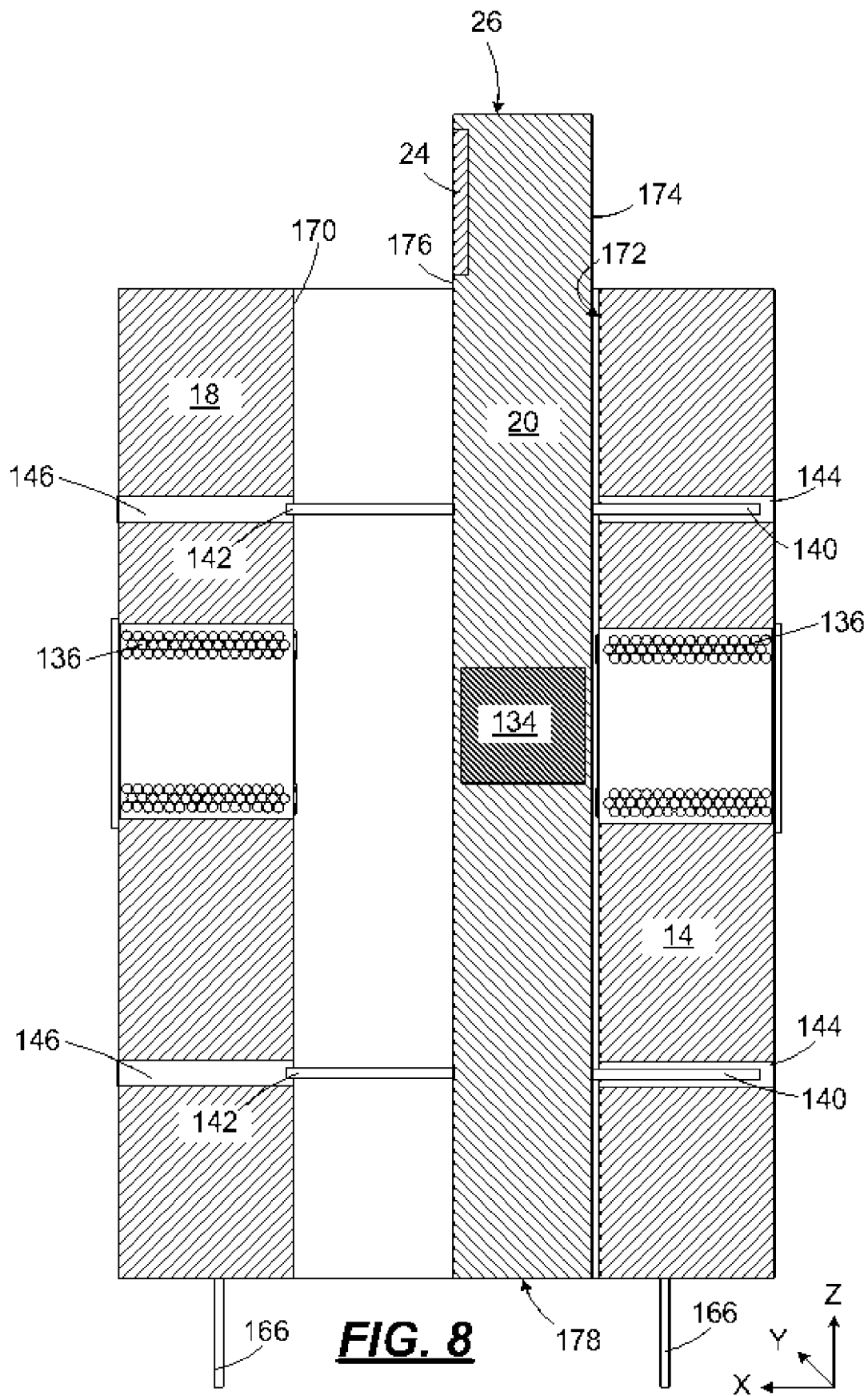
FIG. 8 is a partial cross-sectional view, not to scale, of a switch element according to the disclosure.
Figure 9A:
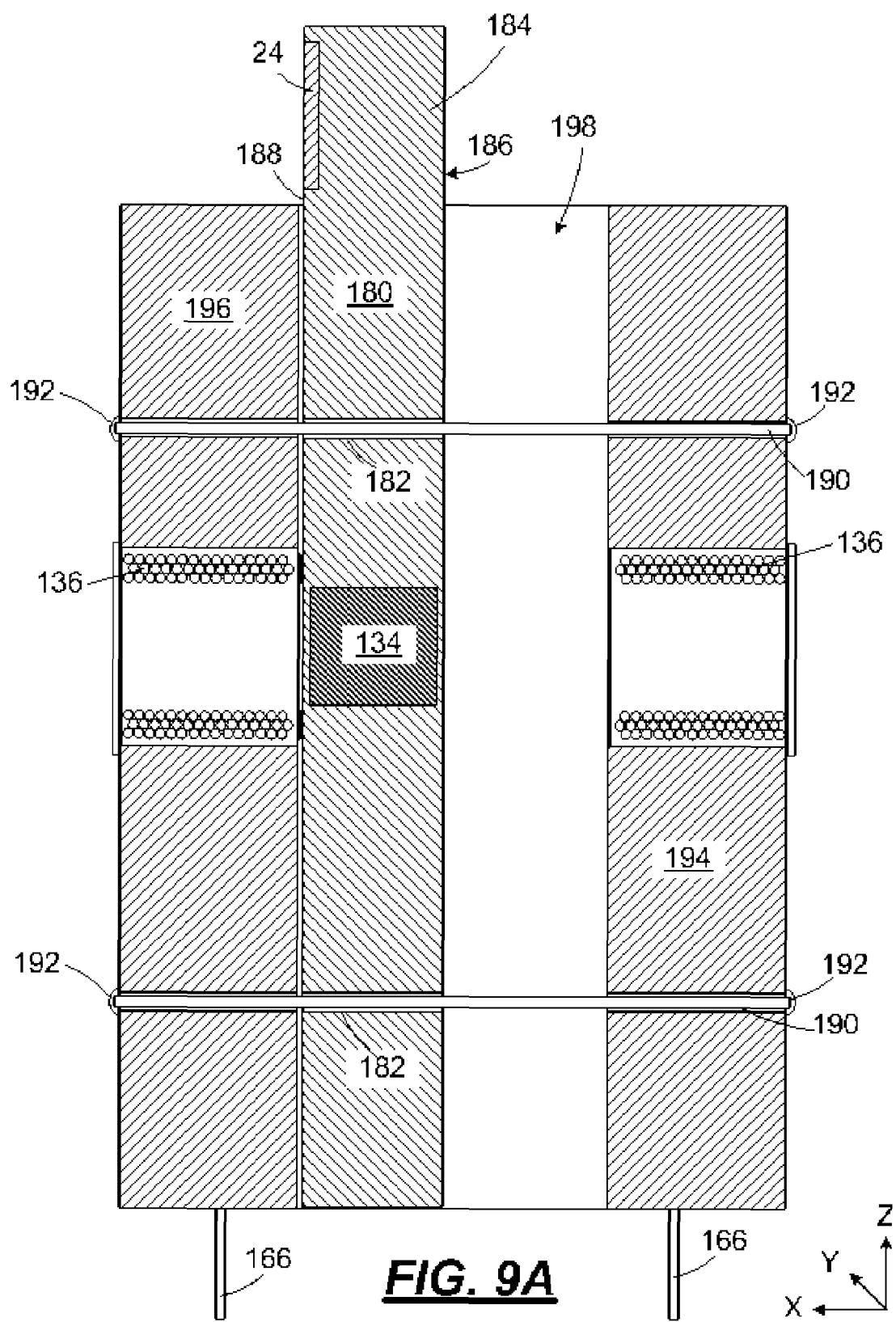
FIGS. 9A and 9B are partial cross-sectional views, not to scale, of a switch element according to another embodiment of the disclosure.
Figure 9B:
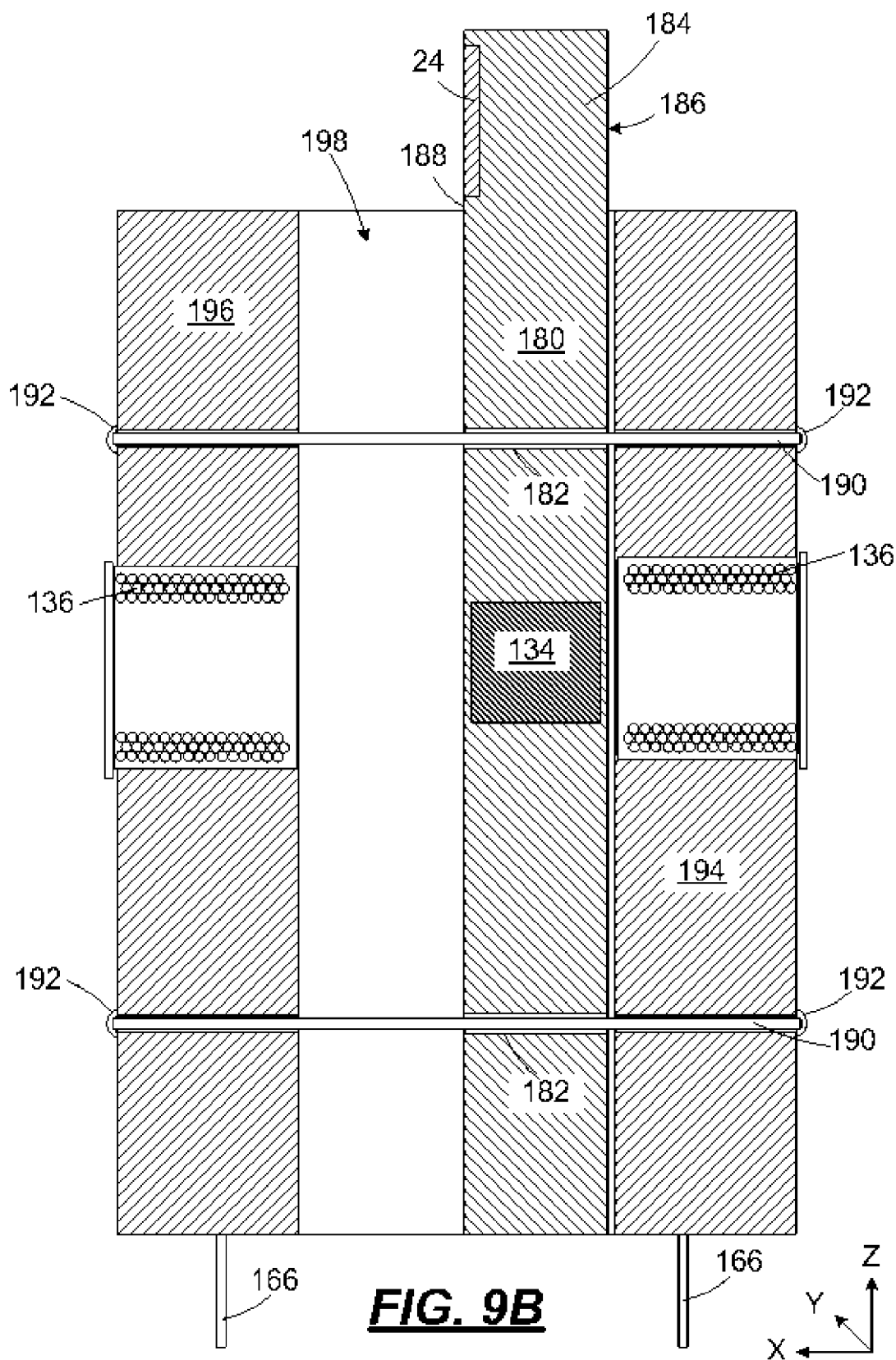
Figure 10:
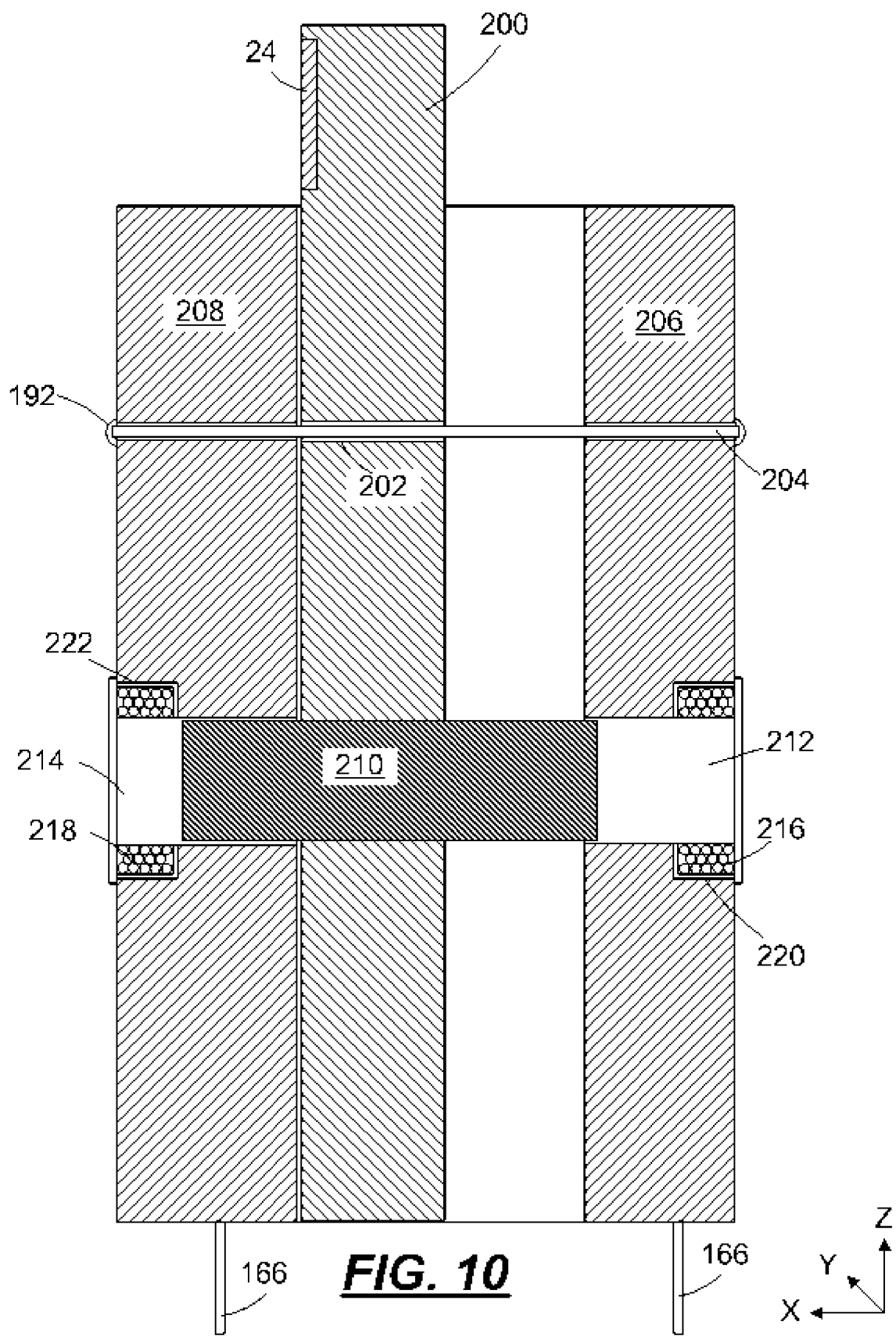
FIG. 10 is a partial cross-sectional view, not to scale, of a switch element according to yet another embodiment of the disclosure.

Details of shuttle guiding arrangements in the channel 16 are illustrated in FIGS. 8–10. In FIG. 8, the shuttle 20 is in the second latch position adjacent surface 172 of the housing component 14. In this embodiment, alignment pins 140 and 142 are attached to opposite surfaces 174 and 176 respectively of the shuttle 20. The alignment pins 140 and 142 move in alignment holes 144 in the housing component 14 and alignment holes 146 in the cover plate component 18. While two pairs of alignment pins 140 and 142 are illustrated, it will be appreciated that one pair of alignment pins 140 and 142 is sufficient to obtain alignment in the Z-direction. Also, the pairs of alignment pins 140 and 142 are shown with the magnet 134 disposed between the pairs of alignment pins 140 and 142. It will be further appreciated that the magnet 134 may be disposed adjacent a proximal end 26 or a distal end 178 of the shuttle 20 rather than between the pairs of alignment pins 140 and 142.

In FIGS. 9A and 9B, an alternative arrangement for guiding a shuttle 180 is illustrated. In this embodiment, the shuttle 180 includes one or more alignment holes 182 through the shuttle body 184 from a first surface 186 to a second surface 188 thereof. One or more guide wires 190 made of metal, silicon dioxide, or optical fiber is attached, as by an adhesive 192 to a housing component 194 and cover plate component 196. In FIG. 9A, the shuttle 180 is disposed in the first latch position with the shuttle 180 being proximate to the cover plate component 196. In FIG. 9B, the coils have been activated to move the shuttle 180 to the second latch position adjacent the housing at a distal end of the channel 198 from the cover plate component 196.

In FIG. 10, a combination of guiding devices is used to maintain the shuttle aligned in the X, Y and Z-directions. In this embodiment, a shuttle 200 includes an alignment hole 202 for guiding movement on guiding wire 204 attached to a housing component 206 and cover plate component 208. A second shuttle guide is provided by a permanent magnet 210 that is attached to the shuttle 200. The permanent magnet 210 is disposed to slide in guide holes 212 and 214 upon activation of coils 216 and 218 disposed in cavities 220 and 222 in the housing component 206 and cover plate component 208 respectively. In this embodiment, the magnet 210 is not embedded in the shuttle 200, however, there is provided sufficient clearance between the coils 216 and 218 so that there is no metal to metal contact between the magnet 210 and the coils 216 and 218 when the shuttle 200 is in either the first or second latch position.

Optical switches 12 and uses therefore which may contain the switch elements described herein are set forth, for example, in U.S. Pat. Nos. 6,430,335; 6,606,429; 6,735,006; and U.S. Publication Nos. 2002/0172453-A1; 2003/0128915-A1; 2003/0206682-A1; 2004/0252937-A1; and 2005/0074236-A1.

Other embodiments of the disclosure will be apparent to those skilled in the art from consideration of the specification and practice of the disclosed embodiments. It is intended that the specification and examples be considered as exemplary only, with a true scope and spirit of the embodiments being indicated by the following claims, including the equivalents thereof available as a matter of law. The disclosed embodiments are susceptible to considerable variation in their practice. Accordingly, the disclosure is not limited to the specific exemplifications set forth hereinabove.

The patentee does not intend to dedicate any disclosed embodiments to the public, and to the extent any disclosed modifications or alterations may not literally fall within the scope of the claims, they are considered to be part of the disclosed embodiments under the doctrine of equivalents.

At numerous places throughout this specification, reference has been made to a number of U.S. Patents. All such cited documents are expressly incorporated in full into this disclosure as if fully set forth herein.

As used throughout the specification and claims, "a" and/or "an" may refer to one or more than one. Unless otherwise indicated, all numbers expressing quantities temperatures, tolerances, measurements, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by disclosed embodiments. At the very least, and not as an attempt to limit the application of the doctrine of equivalents to the scope of the claims, each numerical parameter should at least be construed in light of the number of reported significant digits and by applying ordinary rounding techniques.

What is claimed is:

1. An optical switch element comprising:
a housing containing a longitudinal channel therein having a channel axis defined along a length of the longitudinal channel, wherein the longitudinal channel contains a first machined surface on a first side of the channel, a second surface on an opposite side of the channel from the first surface, a first magnetic coil adjacent the first surface of the channel and a second magnetic coil adjacent the second surface of the channel;
an elongate shuttle having a mirrored surface on at least one end thereof, the elongate shuttle being disposed in the longitudinal channel for lateral movement substantially transverse to the channel axis between a first latch position adjacent the first machined surface and a second latch position adjacent the second surface, and containing a rare earth magnet for interacting with the first and second magnetic coils to cause movement of the shuttle between the first latch position and the second latch position; and
at least one shuttle guide for guiding movement of the shuttle between the first latch position and the second latch position.

2. The optical switch element of claim 1, wherein the rare earth magnet is selected from the group consisting of samarium cobalt and neodymium iron boron.

3. The optical switch element of claim 1, wherein the first machined surfaces comprises a substantially planar surface having a flatness of at least about $\lambda/2$ at 600 nanometers and a roughness grade of N-3 or better.

4. The optical switch element of claim 1, further comprising a second shuttle guide for guiding movement of the shuttle between the first latch position and the second latch position.

5. The optical switch element of claim 4, wherein the rare earth magnet provides the second shuttle guide.

6. The optical switch element of claim 1, wherein the shuttle guide comprises an optical fiber adhesively attached to the housing and a guide channel in the shuttle for movement of the shuttle along a portion of the optical fiber.

7. The optical switch element of claim 1, wherein the housing comprises a channel portion and a cover plate portion.

8. The optical switch element of claim 7, wherein the cover plate portion contains the first machined surface and the shuttle comprises a machined surface for abutting the first machined surface.

9. The optical switch element of claim 1, wherein the second surface comprises a machined surface having a flatness of at least about $\lambda/2$ at 600 nanometers and a roughness grade of N-3 or better.

10. An optical switch device comprising at least one optical switch element of claim 1.

11. A method for manufacturing an optical switch element for an optical switching device comprising the steps of:
providing an elongate housing including a channel portion and a cover plate portion;
machining an elongate channel in the channel portion of the housing, the elongate channel having a channel axis defined along a length thereof and having a first machine surface and a second surface opposite the first surface, wherein the housing includes a first magnetic coil adjacent the first surface and a second magnetic coil adjacent the second surface;
machining a planar surface of the cover plate portion to provide a first latch surface;
providing an elongate substantially rectangular shuttle containing a mirrored surface on at least one end thereof in the elongate channel for lateral movement transverse to the channel axis, wherein the shuttle contains a rare earth magnet for interacting with the first and second magnetic coils;
installing at least one shuttle guide in the housing for translational movement of the shuttle thereon; and
fixedly attaching the cover plate portion to the channel portion to provide the optical switch element.

12. The method of claim 11, wherein the rare earth magnet is selected from the group consisting of samarium cobalt and neodymium iron boron.

13. The method of claim 11, wherein the cover plate is machined to provide a substantially planar surface having a flatness of at least about $\lambda/2$ at 600 nanometers and a roughness grade of N-3 or better.

14. The method of claim 11, further comprising installing a second shuttle guide in the housing for translational movement of the shuttle thereon.

15. The method of claim 14, wherein the rare earth magnet provides the second shuttle guide.

16. The method of claim 11, wherein the shuttle guide comprises an optical fiber, further comprising adhesively attaching the optical fiber to the housing.

17. The method of claim 11, further comprising machining at least one surface of the shuttle to provide a machined surface for abutting the first latch surface of the cover plate.

18. The method of claim 11, further comprising machining the second surface of the channel to provide a second latch surface having a flatness of at least about $\lambda/2$ at 600 nanometers and a roughness grade of N-3 or better.

19. An optical switch element made by the process of claim 11.

20. An optical switch comprising at least one optical switch element of claim 19.

* * * * *